United States Patent
Layne et al.

(10) Patent No.: US 7,382,370 B2
(45) Date of Patent: Jun. 3, 2008

(54) SYSTEM AND METHOD FOR SMOOTHING AND COMPRESSION OF POLYLINE DATA

(75) Inventors: Geary J. Layne, Slidell, LA (US); Marlin L. Gendron, Pass Christian, MS (US); Maura C. Lohrenz, Pearl River, LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 475 days.

(21) Appl. No.: 11/177,651

(22) Filed: Jul. 7, 2005

(65) Prior Publication Data

US 2006/0007232 A1 Jan. 12, 2006

Related U.S. Application Data

(60) Provisional application No. 60/585,789, filed on Jul. 7, 2004, provisional application No. 60/585,790, filed on Jul. 7, 2004.

(51) Int. Cl.
*G06T 17/00* (2006.01)
(52) U.S. Cl. ..................... 345/428; 701/200
(58) Field of Classification Search ............... None
See application file for complete search history.

(56) References Cited

U.S. PATENT DOCUMENTS

| | | | |
|---|---|---|---|
| 4,484,192 A | 11/1984 | Seitz et al. | |
| 4,625,288 A | 11/1986 | Weiner et al. | |
| 5,463,723 A | 10/1995 | Saha | |
| 5,884,219 A | 3/1999 | Curtwright et al. | |
| 6,078,695 A | 6/2000 | Kadono | |
| 6,218,965 B1 | 4/2001 | Gendron et al. | |
| 6,229,918 B1 | 5/2001 | Toyama | |
| 6,249,607 B1 | 6/2001 | Murakawa | |
| 6,728,405 B1 | 4/2004 | Kazato et al. | |
| 6,775,410 B1 | 8/2004 | Loce et al. | |

(Continued)

FOREIGN PATENT DOCUMENTS

JP 0841638 A2 5/1998

OTHER PUBLICATIONS

Lohrenz, M.C.; Edwards, S.S.; Myrick, S.A.; Gendron, M.L.; Trenchard, M.E., "Demonstration of a moving-map system for improved precise lane navigation of amphibious vehicles and land craft", Proceedings, Oceans 2003, vol. 3, pp. 1247-1254.

(Continued)

*Primary Examiner*—Mark Zimmerman
*Assistant Examiner*—David Chu
(74) *Attorney, Agent, or Firm*—John J Karasek; Sally A Ferrett (57) ABSTRACT

A computer-implemented process for smoothing and compression of data having an ordered list of points including a first point, a second point and a third point, each of the points being on the perimeter of a polygon. The method includes determining whether the triangle defined by line segments joining the first, second, and third points has a point of significance in its interior; and if no point of significance is present in the region, removing the second point of the ordered list of points.

14 Claims, 8 Drawing Sheets

U.S. PATENT DOCUMENTS

2003/0025697 A1 2/2003 Gupta
2004/0233197 A1 11/2004 Liu et al.
2006/0009955 A1 1/2006 Gendron et al.

OTHER PUBLICATIONS

Potlapalli, H.; Jaisimha, M.Y.; Barad, H.; Martinez, A.B.; Lohrenz, M.C.; Ryan, J.; Pollard, J., "Classification techniques for digital map compression", Proceedings of the Twenty-First Southeastern Symposium on System Theory, 1989, pp. 263-272.

Jaisimha, M.Y.; Potlapalli, H.; Barad, H.; Martinez, A.B.; Lohrenz, M.C.; Ryan, J.; Pollard, J.; "Data compression techniques for maps", Proc. IEEE Southeastcon '89. ' Energy and Information Technologies in the Southeast'., 1989, vol. 2, pp. 878-883.

Lohrenz, M.C.; Wischow, P.B.; Rosche, H., III; Trenchard, M.E.; Riedlinger, L.M.; "The compressed aeronautical chart database: support of naval aircraft's digital moving map systems", Position Location and Navigation Symposium, 1990. IEEE Plans '90., 1990, pp. 67-73.

Ho, T.K. and Nagy G., "OCR with no shape training", Proceedings of the 15th International Conference on Pattern Recognition, pp. 27-30, Barcelona, Spain, Sep. 3-7, 2000.

Hobby, J. and Ho, T.K., "Enhancing degraded document images via bitmap clustering and averaging", Proceedings of the 4th International Conference on Document Analysis and Recognition, pp. 394-400, Ulm, Germany, (1997).

Jain, A.K., Murty, M.N., and Flynn, P.J., "Data clustering: a review", ACM Computing Surveys, vol. 31, Issue 3, pp. 264-323 (1999).

Layne, G., Gendron, M., and Lohrenz, M., "POS Polyline Smoothing: Reduction of Polyline Vertices", Proceedings of the Tenth International Conference on Industry, Engineering and Management Systems, Cocoa Beach, FL, presented in Mar. 2004.

Layne, G., Gendron, M., and Lohrenz, M., "POS Polyline Smoothing: Reduction of Polyline Vertices", Tenth International Conference on Industry, Engineering and Management Systems, Cocoa Beach, FL, viewgraphs, pp. 1-13, presented in Mar. 2004.

Voorhees, E.M., "The cluster hypothesis revisited", Proceedings of the 8th Annual International ACM SIGIR Conference on Research and Development in Information Retrieval, pp. 188-196 (1985).

Yoon, J.P., Raghavan, V., and Chakilam, V., "BitCube: a three-dimensional bitmap indexing for XML documents", Journal of Intelligent Information Systems, vol. 17, pp. 241-252 (2001).

M.L. Gendron, "Algorithms and Data Structures for Automated Change Detection and Classification of Sidescan Sonar Imagery", dissertation submitted to U. of New Orleans in Dec. 2004, cataloged Jan. 28, 2005, pp. 27-67.

Lohrenz, M.C.; Edwards, S.S.; Myrick, S.A.; Gendron, M.L.; Trenchard, M.E., "Demonstration of a moving-map system for improved precise lane navigation of amphibious vehicles and landing craft", Proceedings, Oceans 2003, vol. 3, pp. 1247-1254.

Potlapalli, H.; Jaisimha, M.Y.; Barad, H.; Martinez, A.B.; Lohrenz, M.C.; Ryan, J.; Pollard, J., "Classification techniques for digital map compression", Proceedings of the Twenty-First Southeastern Symposium on System Theory, 1989, pp. 263-272.

Jaisimha, M.Y.; Potlapalli, H.; Barad, H.; Martinez, A.B.; Lohrenz, M.C.; Ryan, J.; Pollard, J.; "Data compression techniques for maps", Proc. IEEE Southeastcon '89. 'Energy and Information Technologies in the Southeast'., 1989, vol. 2, pp. 878-883.

Lohrenz, M.C.; Wischow, P.B.; Rosche, H., III; Trenchard, M.E.; Riedlinger, L.M.; "The compressed aeronautical chart database: support of naval aircraft's digital moving map systems", Position Location and Navigation Symposium, 1990. IEEE PLANS '90., 1990, pp. 67-73.

SYSTEM AND METHOD FOR SMOOTHING AND COMPRESSION OF POLYLINE DATA

This application claims the benefit of provisional applications 60/585,789 and 60/585,790, both filed in the U.S. on Jul. 7, 2004, each of which are incorporated by reference herein in their entireties.

BACKGROUND OF THE INVENTION

1. Field of the Invention

This invention relates in general to a system and method for compression of data points having at least two coordinates, and more particularly to data in vector or raster format, and to a method for smoothing and compression of polyline data.

2. Background Information

Clustering algorithms have been developed in support of various disciplines, including biology (e.g., clustering bacterial growth), physics (e.g., clustering high-energy particles), demographics (e.g., clustering populations), medicine (e.g., identifying clusters of tumors), and information technology (e.g., data mining, compression, and sorting; image classification, segmentation, and retrieval).

Some aspects of clustering are described in: Barnard, J. M., "Agglomerative hierarchical clustering package from Barnard Chemical Information, Ltd.", Daylight EUROMUG Meeting, Basel, Switzerland (1996); Can, F. and Ozkarahan, E. A., "Concepts and effectiveness of the cover-coefficient-based clustering methodology for text databases", ACM TODS 15(4): 483-512 (December 1990); Cormen, T. H., Leiserson, C. E., and Rivest, R. L., "Introduction to Algorithms", Second Edition, MIT Press and McGraw-Hill, Cambridge, Mass. (2001); Day, W. H. E. and H. Edelsbrunner, "Efficient algorithms for agglomerative hierarchical clustering methods", Journal of Classification, 1(1), pp. 7-24 (1984); Downs, G., "Clustering in chemistry", MathFIT workshop, Belfast (2001); Downs, G. M. and J. M. Barnard, "Clustering methods and their uses in computational chemistry", Reviews in Computational Chemistry, Vol. 18, Ch. 1, pp. 5-40 (2003); U.S. Pat. No. 6,218,965 B1 to Gendron, M. L., Wischow, P. B., Trenchard, M. E., Lohrenz, M. C., Riedlinger L. M., and Mehaffey, M. J., "Moving Map Composer", Halkidi, M., Batistakis Y., and Vazirgiannis, M., "Cluster validity methods: Part II", SIGMOD Record (2002); Hartigan, J. A., "Clustering Algorithms", John Wiley and Sons, Inc., New York, N.Y. (1975); Hartigan, J. A. and Wong, M. A., "A K-means clustering algorithm", Applied Statistics, Vol. 28, 100-108 (1979); Ho, T. K. and Nagy G., "OCR with no shape training", Proceedings of the 15th International Conference on Pattern Recognition, pp. 27-30, Barcelona, Spain, 2000; Hobby, J. and T. K. Ho, "Enhancing degraded document images via bitmap clustering and averaging", Proceedings of the 4th International Conference on Document Analysis and Recognition, pp. 394-400, Ulm, Germany, (1997); Hoppner, F., Klawonn, F., Kruse R., and Runkler, T., "Fuzzy Cluster Analysis", John Wiley and Sons, Inc., Chicester, England, (1999); Jain, A. K., M. N. Murty, and P. J. Flynn, "Data clustering: a review", ACM Computing Surveys, Vol. 31, Issue 3, pp. 264-323 (1999); JMPIN V.4.0.4 statistical analysis software package, SAS Institute Inc., Cary, N.C. (2003); Layne, G., M. Gendron and M. Lohrenz, "POS Polyline Smoothing: Reduction of Polyline Vertices", Proceedings of the Tenth International Conference on Industry, Engineering and Management Systems, Cocoa Beach, Fla., March, 2004; Sibson, R., "SLINK: An Optimally Efficient Algorithm for the Single-Link Cluster Method", Comput. J. 16(1): 30-34(1973); Spiegel, M. R., "Schaum's outline of theory and problems of probability and statistics", Schaum's outline series, McGraw-Hill, New York, N.Y. (1975); Voorhees, E. M. "The effectiveness and efficiency of agglomerative hierarchic clustering in Document Retrieval", Ph.D. Thesis, Cornell University, N.Y. (1985a); Voorhees, E. M., "The cluster hypothesis revisited", Proceedings of the 8th Annual International ACM SIGIR Conference on Research and Development in Information Retrieval, pp. 188-196 (1985); and Yoon, J. P., Raghavan, V., and Chakilam, V., "BitCube: a three-dimensional bitmap indexing for XML documents", Journal of Intelligent Information Systems, 17:241-252 (2001).

U.S. patent application Publication No. 20040233197 to Liu et al. discloses a method for data compression for reducing the complexity of lines representing handwriting. Curve smoothing for lines CAD generated lines is disclosed in U.S. patent application Publication No. 20030025697 to Gupta.

SUMMARY OF THE INVENTION

One embodiment of the invention is directed to a computer-implemented process for smoothing and compression of data having an ordered list of points including a first point, a second point and a third point, each of the points being on the perimeter of a polygon. The method includes determining whether the triangle defined by line segments joining the first, second, and third points has a point of significance in its interior; and if no point of significance is present in the region, removing the second point of the ordered list of points. The data can include at least one point of significance contained within a space defined by the polygon. There can exist a spatial relationship between the data points. The points can be represented by bits in a bitmap. The data can have geospatial coordinates, and each point can have a latitude coordinate and a longitude coordinate. The method can further include generating the ordered list of points by mapping each of point of significance into a bitmap; applying an expansion shape to each of the mapped points of significance to form clusters; and for each cluster, generating the ordered list of points as the vertex bits on the boundary of the cluster. The method can further include determining whether the region defined by line segments joining the first point, the third point, and a fourth point of the ordered list of points has a point of significance in its interior, and if no point of significance is present, removing the second and third of the ordered list of points. The method can further include determining whether removing the second and third points will increase or decrease the area of the polygon.

Another embodiment of the invention is directed to a computer implemented method for smoothing and compression of data having an ordered list of points including a first point, a second point, a third point, and a fourth point, the method comprising: determining whether the first, second, and third points are colinear, and if so, removing the second point of the ordered list of points; or determining whether the first, third, and fourth points are colinear, and if so, removing the second of the ordered list of points. The step of removing can be done without first determining whether a point of significance is located within a region defined by the points. The step of determining whether a point of significance is present includes a logical AND operation between a bitmap representing the points of significance and a bitmap representing the triangle.

One embodiment of the invention is directed to a computer-implemented process for smoothing and compression of data having an ordered list of points including a first point, a second point and a third point, each of the points being on the perimeter of a polygon. The method includes determining whether the triangle defined by line segments joining the first, second, and third points has a point of significance in its interior; and if no point of significance is present in the region, removing the second point of the ordered list of points. The data can include at least one point of significance contained within a space defined by the polygon.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

The invention, referred to herein as a polyline smoothing and compression system and method, is useful for compressing polyline data, including but not limited to, geospatial data having positional information such as latitude and longitude.

The term smoothing refers to the process of removing vertices from a polyline.

The polyline can result from a process of clustering objects and identifying vertex bits that form the boundary of the clusters, or any other process that produces data representing a polyline.

Clustering is the process of grouping like objects together, and can be an efficient way to efficiently store and convey information about groups of object or points. The objects can efficiently be clustered into groups using the techniques set forth in U.S. application Ser. No. 10/997,921 as described in U.S. application Ser. No. 10/997,921, filed Jul. 7, 2004, and incorporated herein by reference, to identify just the vertex points of a polygon surrounding each group of objects. One characteristic that can define the similarity of the objects is their geographical location (e.g., latitude and longitude), although many other characteristics can suitably be used to define the similarity of the objects.

In embodiments of the invention, the points of the polyline can be bits in an bitmap of two or more dimensions, or points in an n-dimensional vector space.

Figure 1:
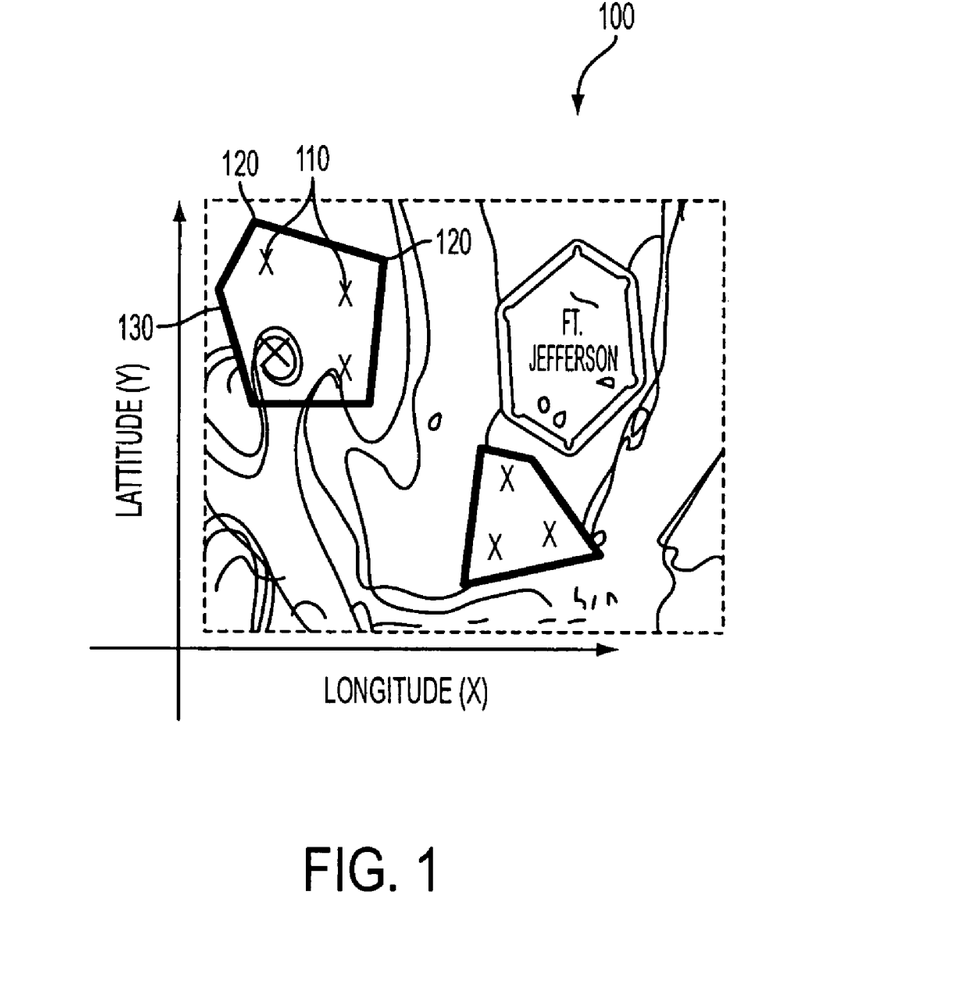
FIG. 1 shows a typical map with polylines bounding clusters of objects before smoothing and compression in accordance with an embodiment of the invention.

FIG. 1 illustrates a two-dimensional space 100 in which the vertex points 120 define a polyline 130. The polyline can be open, or can be closed to form a polygon surrounding one or more points of significance 110. If the polyline has a large number of vertices, it can be useful to reduce the complexity of the polyline by removing some of the vertices. Reducing the number of vertices can reduce image complexity, increase processing speed, and make the resulting polygon more aesthetically pleasing.

It is also suitable to remove some of the vertices in a manner that will not significantly reduce or degrade the information represented by the polyline according to one or more user defined criteria. For example, one user defined criterion is that the polyline is smoothed and compressed in a manner that will not exclude any of the points of significance from the polygon. Another user defined criterion is that the density of the polygon (number of points of significance in the polygon divided by the polygon area) will not be reduced, e.g., the area of the polygon will be less than the original area, while retaining all of the original points of significance. These user defined criteria are discussed further in paragraphs addressing FIGS. 5 and 6. Other user defined criteria can also be implemented within the scope of the invention.

Figure 2A:
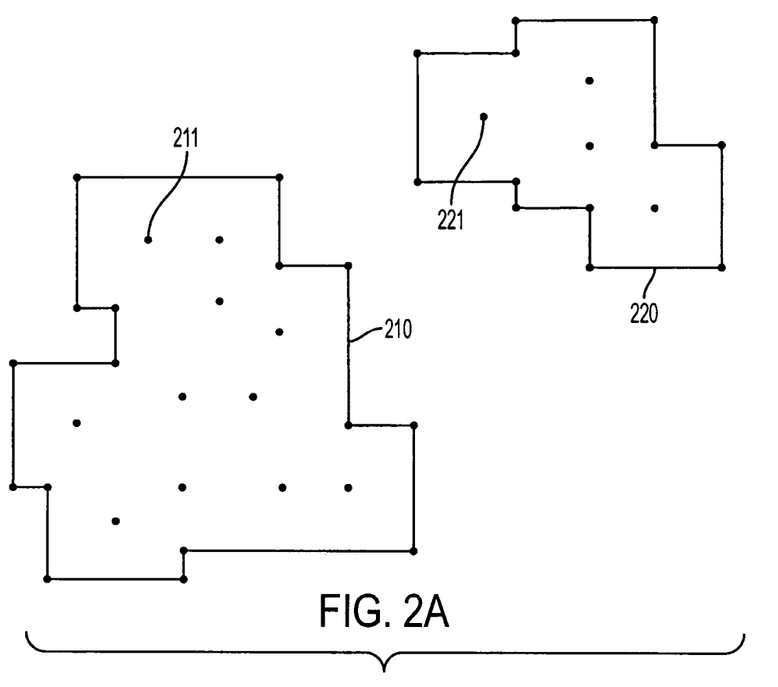
FIG. 2A shows typical polylines prior to smoothing and compression according to an embodiment of the invention.

FIG. 2A illustrates polygons 210, 220 that resulted from an exemplary clustering process set forth in U.S. patent application Ser. No. 10/997,091, and having points of significance 211, 221 within the polygons. Other processes that result in an ordered list of points can also be used to generate the polyline vertices.

Figure 2B:
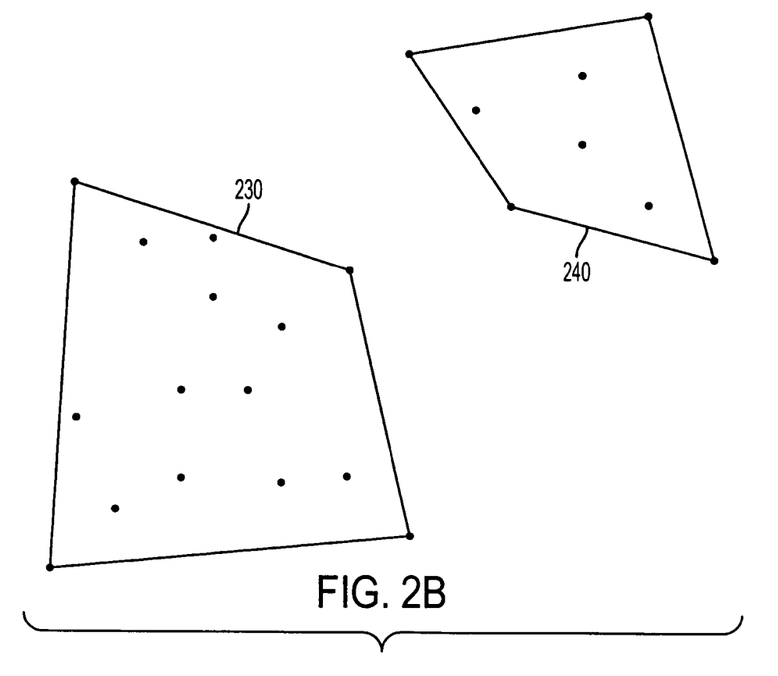
FIG. 2B illustrates a typical polylines after smoothing and compression according to an embodiment of the invention.

FIG. 2B illustrates polygons 230, 240 after a smoothing process according to an exemplary embodiment of the invention. For polygon 210, the smoothing process removed 12 of the original 16 vertices, resulting in polygon 230 having only four vertices without excluding any of the original 11 points of significance. Similarly, applying the smoothing process to polygon 220 removed 8 of the original 12 vertices, resulting in polygon 240 having only four vertices without excluding any of the original points of significance 221.

Figure 3:
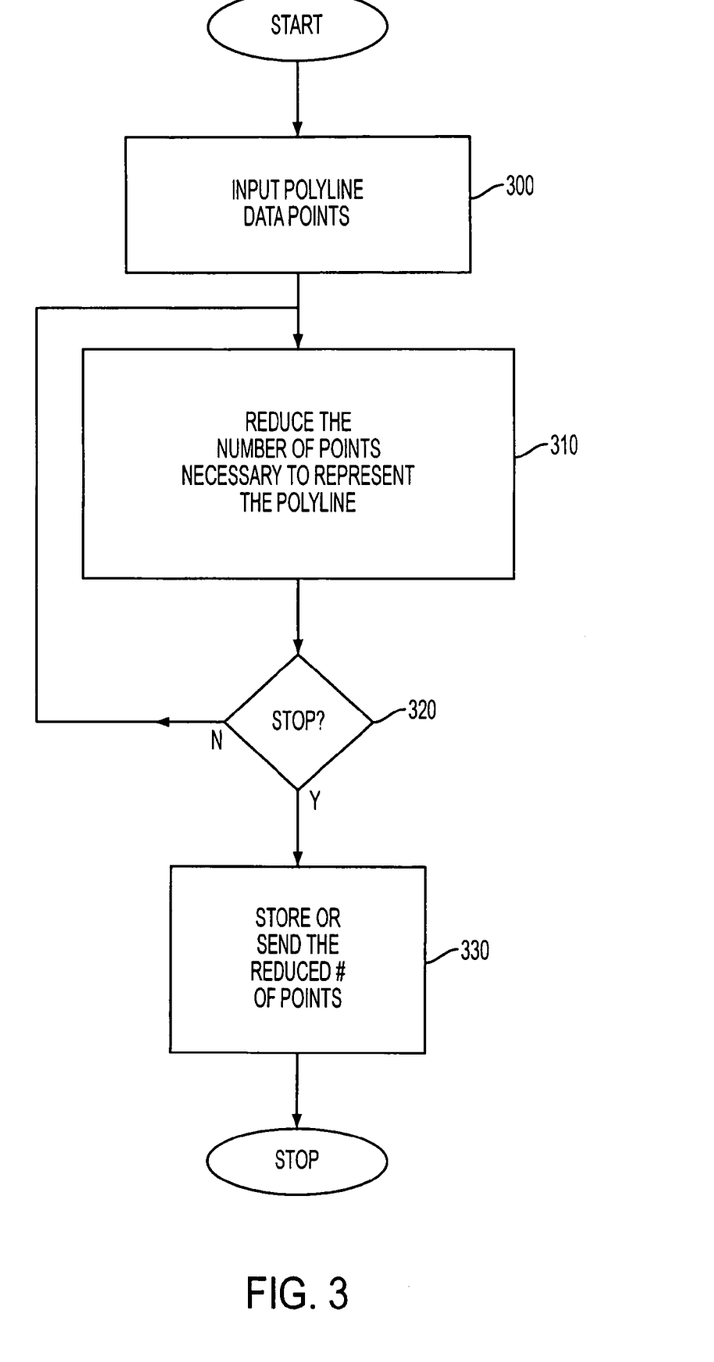
FIG. 3 illustrates a simplified flow diagram of the smoothing and compression process according to an embodiment of the invention.

FIG. 3A is a simplified flow diagram of the process in accordance with an embodiment of the invention.

The input 300 to the smoothing process can be polyline data represented as an ordered list of points of the polyline to be smoothed, e.g., the polyline vertices. The list of vertices can be the result of the clustering process described in previous paragraphs, or another process. The list of vertices can be clockwise or counterclockwise, or any suitable direction.

To reduce the number of points necessary to represent the polyline, the smoothing algorithm traverses the list iteratively 310 until a stopping condition is met 320. Upon completion, the algorithm returns a modified list of vertices, and stores and/or forwards the reduced list of points for display or further processing 330.

Figure 4:
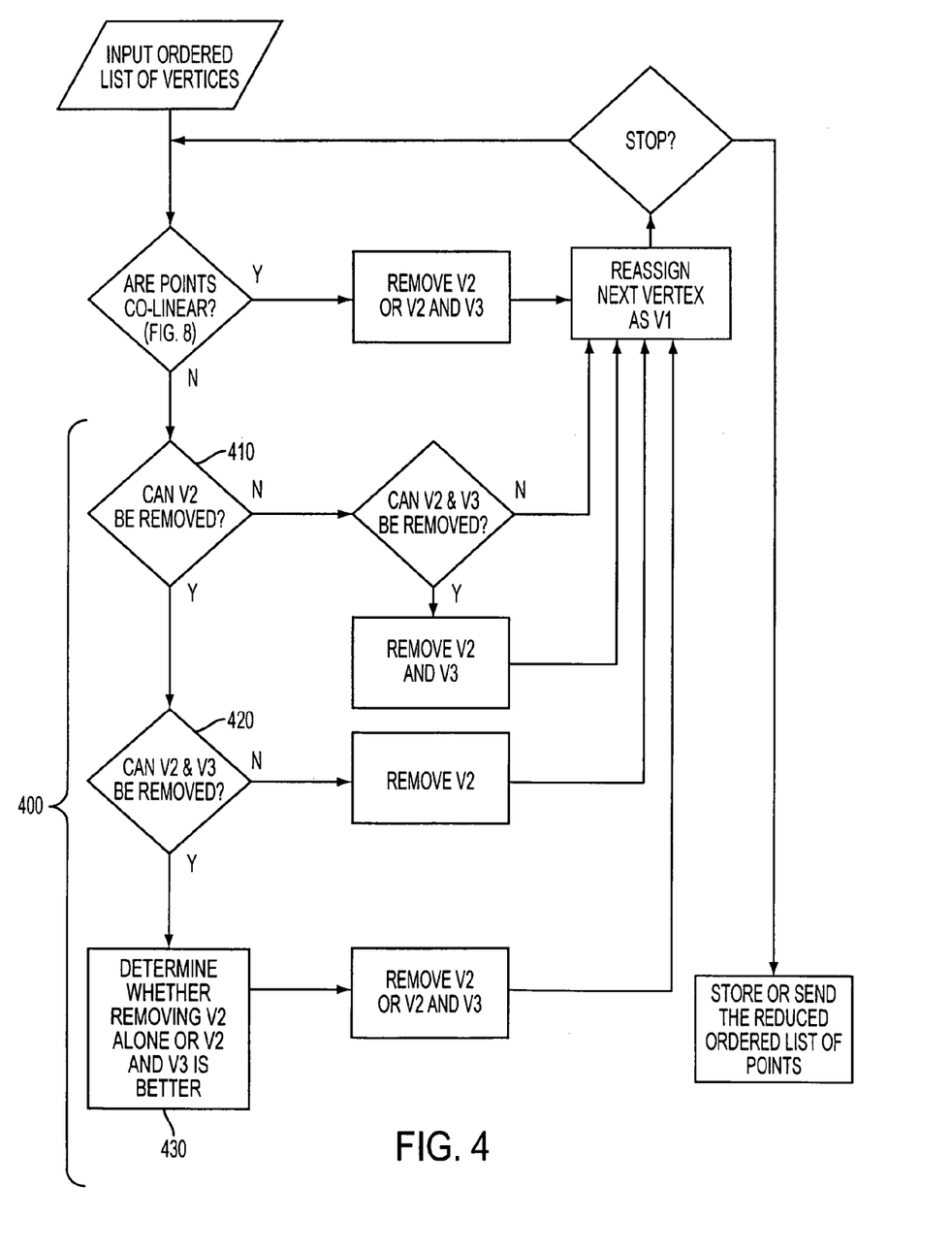
FIG. 4 illustrates a simplified flow diagram of steps of the smoothing and compression process according to an embodiment of the invention.

Referring next to FIG. 4, during each iteration 400, or one complete traversal of the list, a decision to drop vertices is made based on the current vertex. The current vertex and the following three vertices are considered independently of the rest. There are three steps in the decision-making process: 1) determine if the next vertex can be removed 410, 2) determine if the next two vertices can be removed 420, and 3) determine which of the available removal options is most desirable 430. In an exemplary embodiment in which it is desired that the density of the polygon will not be reduced, the area of the resulting polygon will be equal to or less than the starting area.

Figure 5A:
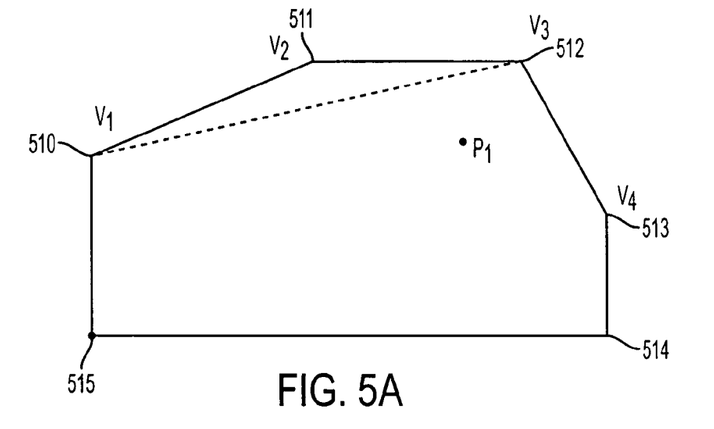
FIGS. 5A-5C show an example of some features of the process according to an embodiment of the invention.
Figure 5B:
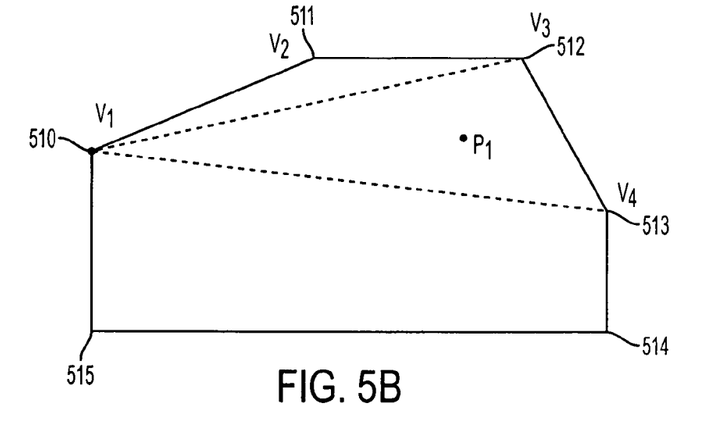
Figure 5C:
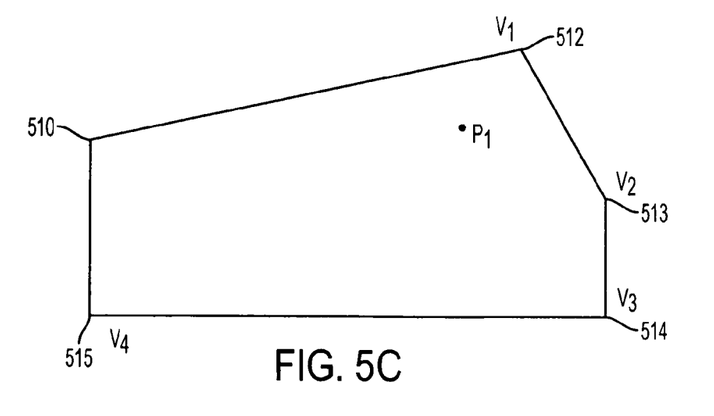

FIGS. 5A-5C illustrates an example of the decision making process for a portion of a polygon 500 having vertices 510, 511, 512, 513, 514, and 515 and interior point 520 (P1). It is desired that the polygon that results from the removal of vertices should contain all the points of significance. Starting at with point 510 as the first vertex V1, a decision is made whether to remove the subsequent vertex 511 (V2) by determining whether any points exist in the interior of a triangle defined by the starting vertex 510 (V1), the next vertex 511 (V2), and the third vertex 512 (V3). If no points exist in the interior of this triangle, the vertex V2 can be removed. If a point is present in the interior of the triangle defined by V1, V2, and V3, the vertex V2 is not removed. Since no point exists in the interior of the triangle, the vertex 511 (V2) can be removed.

After determining whether 2V can be removed, a decision is made whether the second vertex V2 and the third vertex V3 can be removed together. Note that the line segment connecting V1 and V4 does not intersect the line segment joining V2 and V3. Therefore, the triangle defined by vertices V1, V3, and V4 is evaluated to determining whether any points exist in the interior of that triangle. If a point is present in the interior of the triangle defined by V1, V3, and V4, it is not possible to remove both V3 and V2, so only the vertex V2 is removed. If no points exist in the interior of this triangle, both vertices V2 and V3 can be removed.

Next, a decision is made whether it is better to remove V2 and V3, or whether it is better to remove only V2. This decision depends on the user-defined criteria. For example, if P1 were not present, the options would be that 1) V2 can be removed and, 2) V2 and V3 can be removed. If the user defined criterion is that the removal criteria selected should result in the greatest decrease in polygon area, then only V2 should be removed.

However, since P1 is present within the triangle defined by V1, V2, and V3, it is determined that only V2 can be removed. FIG. 5C illustrates the polygon after removal of the vertex V2.

For the next step, the next remaining vertex (V3) that follows V1 in the resulting polygon is assigned as the starting vertex V1 and the process continues until a stopping point is reached. In this example, point 512 is assigned as the starting vertex V1 in FIG. 5C, and the process is repeated to determine whether the next two vertices 513 (V2) and 514 (V3) should be removed.

Figure 6A:
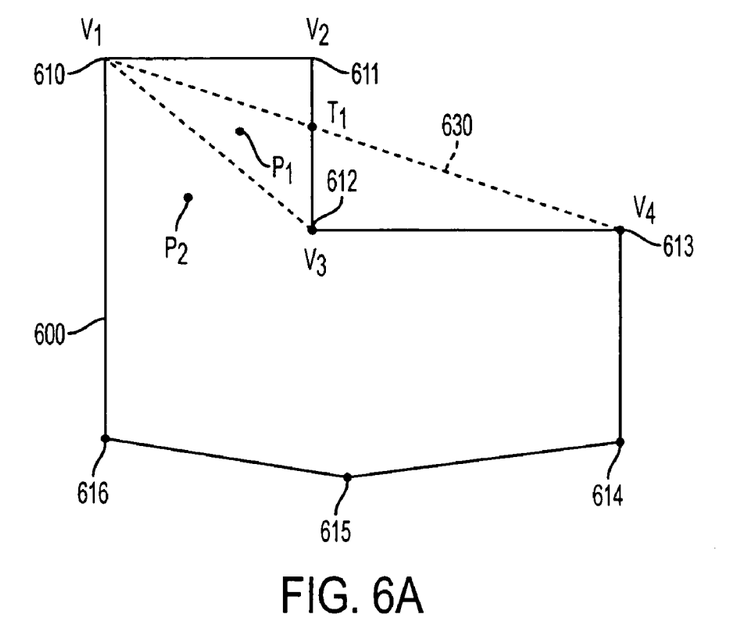
FIGS. 6A-6B show an example of some features of the process according to an embodiment of the invention.
Figure 6B:
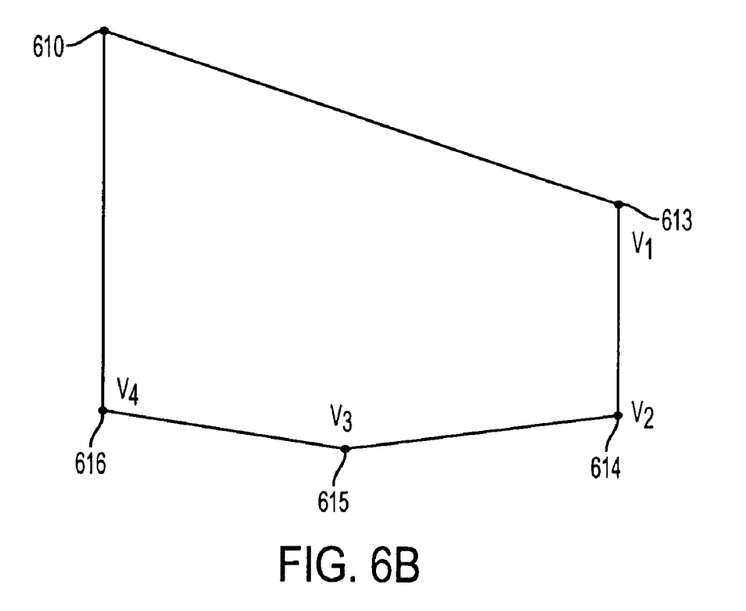

FIGS. 6A-6B illustrates another example of the decision-making process with a polygon 600 having vertices 610, 611, 612, 613, 614, and 615 and interior point 620 (P1) and 622 (P2). Starting at vertex 610 (V1), a decision is made whether to remove the subsequent vertex 612 by determining whether any points exist in the interior of a triangle defined by the starting vertex V1, the next vertex V2, and the third vertex V3. Since the point P1 is present in the interior of the triangle defined by V1, V2, and V3, the vertex V2 is not removed. If P1 were not present in the interior of this triangle, V2 could be removed.

Note that the line segment 630 connecting V1 and V4 intersects the line segment joining the second and third vertices V2 and V3. When this is true, is possible that when V2 alone cannot be removed, both V2 and V3 can be removed if doing so will not exclude the point P1 from the resulting polygon, and if the area of the polygon that results from removing V2 and V3 is less than the area of the polygon that includes the vertices V2 and V3.

The line segment that connects V1 and V4 is a portion of the polygon that would result if both vertices V2 and V3 were removed. The line segment 630 connecting vertices V1 and V4 intersects the polyline at a point T1. The triangular area formed by points V1, V2, and T1 is evaluated to see whether a point of significance exists within the triangle. If a point is present within this triangle, it is not possible to remove both vertices V2 and V3. However, as seen in FIG. 6A, since no point exists within the triangle formed by points V1, V2, and T1, it is next determined whether removing both of the vertices V2 and V3 will result in an increase or decrease in polygon area. For example, the potential addition to the area of the polygon 600 is the area of the triangle formed by T1, V3, and V4 and the potential decrease in the area of the polygon 600 is the area of the triangle formed by V1, V2, and T1. If the potential increase in area is less than the potential decrease in area, both the vertices V2 and V3 are removed.

Note that in the example shown in FIG. 6A, it is not necessary to determine whether a point exists in the triangle formed by the points T1, V3, and V4 because this triangle is external to the polygon.

Thus, FIG. 6A illustrates an example in which point V2 cannot be removed by itself, however, removal of V2 and V3 together will reduce the area of the polygon and will not exclude any points of significance from the polygon. Accordingly, V2 and V3 can be removed. FIG. 6B illustrates the resulting reduced polygon with vertices V2 and V3 removed. For the next step, point 613 becomes the new starting vertex, and points 614 and 615 are evaluated to determine whether they can be removed.

Note that FIGS. 6A and 6B illustrate a user-defined criterion that vertex removal should be based on which removal option will reduce the area the most. Other criteria are also suitable. For example, the criterion could be that the removal option should be selected that minimizes the change in area of the polygon.

Figure 7A:
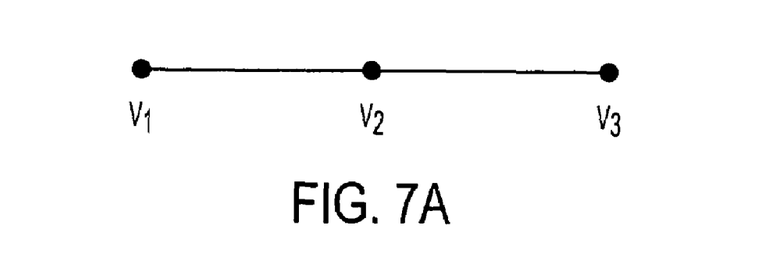
FIGS. 7A and 7B illustrate some features of the process according to an embodiment of the invention.
Figure 7B:
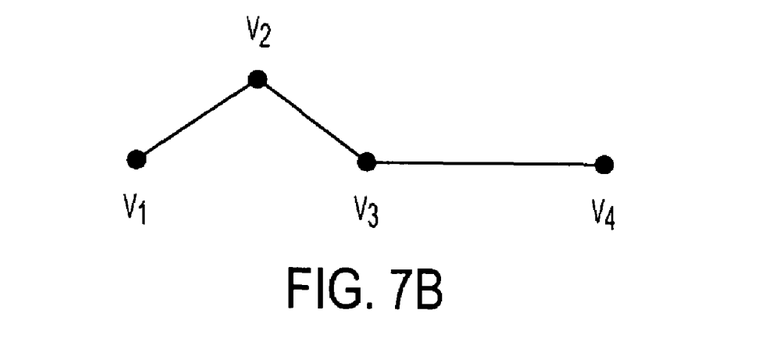

The process can also include steps to rapidly remove vertices if the situations illustrated in FIGS. 7A and 7B occur.

As illustrated in FIG. 7A, if three adjacent vertices V1, V2, and V3 are colinear, the middle vertex V2 can be immediately removed without determining whether any points within the polygon would be excluded from the polygon if the vertex V2 were removed and without determining whether removing vertices V2 and V3 would reduce the area of the polygon. A next step is to assign the third vertex V3 as the new starting vertex, and to evaluate whether subsequent vertices can be removed.

FIG. 7B illustrates an example in which V1, V3, and V4 are colinear. If removal of V2 is determined to be acceptable (e.g., if no point of significance exists in the triangle formed by V1, V2, and V3, both V2 and V3 can be immediately removed.

Iteration of the process steps described above through the ordered points continues until a stopping criteria is reached. In an exemplary embodiment, the stopping criteria can be one or more of: stop when a predetermined number of iterations is complete; stop when a complete iteration around the polygon is made with no vertex removals; stop when the polygon is reduced to a desired number of vertices (e.g., three). Other stopping criteria can also be selected.

The process can be accomplished using lists of ordered data that represent vertices of a polyline and points of significance associated with the polyline, and can be in vector format or raster format.

Figure 8A:
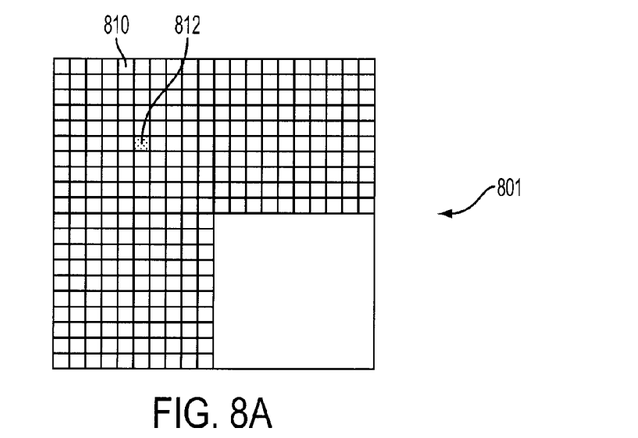
FIGS. 8A-8C illustrate a logical operation on geospatial bitmaps which accomplishes the process according to an embodiment of the invention.

In an exemplary embodiment, the vertices of a polyline represent bits in a two dimensional bitmap, and in particular, a geospatial bitmap. In an exemplary bitmap, the bits are turned on (set) or off (cleared), and each bit has a unique position defined by its row and column. In a geospatial bitmap, each bit represents a unique location in a coordinate system at a given resolution. A set bit denotes that data (e.g., a point of significance) exists at a specific coordinate. In a geospatial bitmap 800 the rows can represent latitude and the columns can represent longitude. A set bit represents a point of significance. The method set forth in the previous paragraphs can be implemented in many spatial formats, however, is particularly effective when executed in a bitmap format, and more particularly in geospatial bitmaps. Logical operations can be performed in bitmap format for polygons that result from the smoothing process described in previous paragraphs, or for polygons and points of significance before the clustering process described in application Ser. No. 10/997,091 or before the smoothing process described above.

It is useful to organize a number of bits in a bitmap into tiles for memory allocation, each tile containing a number of bits. For example, a bitmap with 100×100 bits can be organized into 100 tiles, each tile having 10×10 bits. Memory can be allocated to the tiles that have at least one set bit. No memory is allocated to a tile unless it includes at least one set bit.

If FIG. 8A shows a geospatial bitmap 800 having a number of tiles, each tile having 100 bits (10×10), in which memory is allocated only to the three tiles that include a set bit. Each set bit represents a point of significance. Although bitmaps can have many more tiles, FIG. 8A is shown with only four tiles for convenience.

Figure 8B:
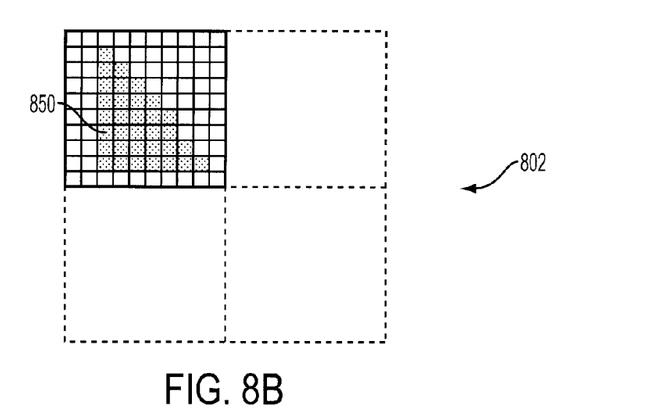

FIG. 8B shows a bitmap 820 that has bits set to represent a triangle 850. Each of the bits on the perimeter and the interior of the triangle 850 are set. Although the bitmap 820 has only one tile, the bitmap can include one or more tiles if the triangle extends over more than one tile. The bitmap 820 with the triangle 850 typically is smaller than the bitmap 800 having the set bits corresponding to the points of significance. Preferably, the bitmap 820 has a known spatial relationship with the bitmap 800 so that logical operations can be performed between the bitmaps. For example, if the bitmaps 800 and 820 are geospatial bitmaps, the bits have geographic coordinates that allow them to be overlaid and to have logical operations performed between the bitmaps.

To determine whether a point is present in a triangle, a logical AND can be performed between the bitmap 800 and the bitmap 820. Since the bitmap 820 is typically smaller than the bitmap 800, it is necessary to only perform the logical AND operation on the bits in the smaller bitmap. For example, each bit in the smaller bitmap 820 is ANDed with the corresponding bit in the larger bitmap 800. Since one of the bits in the smaller bitmap overlies a set bit in the bitmap 800 that represents a point of significance 812, the result is the bitmap 830 illustrated in FIG. 8C, with one set bit 832. The bitmap 830 has the same extent as the smaller bitmap 820. Note that the dashed lines in FIGS. 8B and 8C are provided to illustrate the spatial relationship of the bitmaps 820 and 830 with the larger bitmap 800.

Figure 8C:
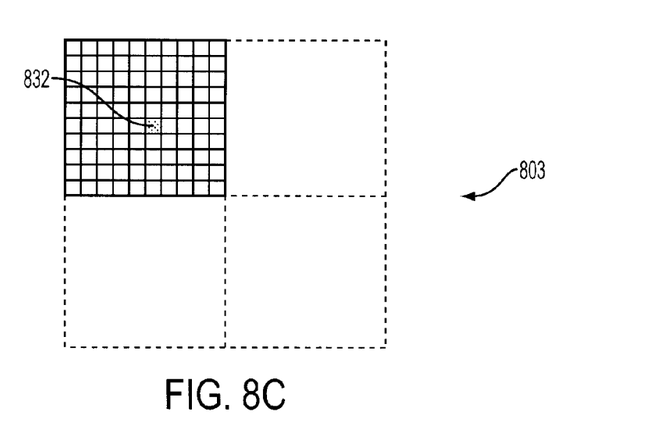

The process illustrated in FIGS. 8A-8C is a rapid and efficient method of implementing the step shown in FIGS. 4, 5, and 6 of deciding whether a vertex can be removed based on the presence or absence of a point within a triangle. In this example, since a set bit is present in the bitmap 830 of FIG. 8C, removal of a polyline vertex in question would be allowed.

Other embodiments include computer software and computer programs, as well as computer systems and computer readable media having programs for implementing the methods discussed above. A computer system is generally applicable for the various embodiments described according to the present invention. The computer system can include a processor, a volatile memory, e.g., RAM, a keyboard, a pointing device, e.g., a mouse, a nonvolatile memory, e.g., ROM, hard disk, floppy disk, CD-ROM, and DVD, and a display device having a display screen. Memory can store program instructions that are executable by a processor to implement various embodiments of a method in accordance with the present invention. A communications device may also be connected to enable information exchange between the computer system and other devices.

It should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include FORTRAN, XML, C++ objects, Java and Microsoft Foundation Classes (MFC).

Obviously, many modifications and variations of the present invention are possible in light of the above teachings. It is therefore to be understood that the claimed invention may be practiced otherwise than as specifically described.

What is claimed is:

1. A computer-implemented process for smoothing and compression of data having an ordered list of points including a first point, a second point and a third point, each of the points being on the perimeter of a polygon, the method comprising:
   determining whether the triangle defined by line segments joining the first, second, and third points has a point of significance in its interior; and
   if no point of significance is present in the region, removing the second point of the ordered list of points.

2. A method according to claim 1, wherein the data includes at least one point of significance contained within a space defined by the polygon.

3. A method according to claim 1, wherein there exists a spatial relationship between the data points.

4. A method according to claim 1, wherein the points are represented by bits in a bitmap.

5. A method according to claim 1, wherein the data has geospatial coordinates.

6. A method according to claim 1, wherein each point has a latitude coordinate and a longitude coordinate.

7. A method according to claim 1, further comprising:
   generating the ordered list of points by mapping each of point of significance into a bitmap;
   applying an expansion shape to each of the mapped points of significance to form clusters; and
   for each cluster, generating the ordered list of points as the vertex bits on the boundary of the cluster.

8. A method according to claim 1, further comprising:
   determining whether the region defined by line segments joining the first point, the third point, and a fourth point of the ordered list of points has a point of significance in its interior, and
   if no point of significance is present, removing the second and third of the ordered list of points.

9. A method according to claim 5, further comprising:
   determining whether removing the second and third points will increase or decrease the area of the polygon.

10. A method according to claim 5, further comprising:

applying a user-defined criterion to determine whether the second and third points are removed.

11. The method of claim 8, wherein said removing is done without first determining whether a point of significance is located within a region defined by the points.

12. The method of claim 1, wherein said determining whether a point of significance is present includes a logical AND operation between a bitmap representing the points of significance and a bitmap representing the triangle.

13. A computer operating a method for smoothing and compression of data having an ordered list of points including a first point, a second point and a third point, each of the points being on the perimeter of a polygon, the method comprising:

determining whether the triangle defined by line segments joining the first, second, and third points has a point of significance in its interior; and if no point of significance is present in the region, removing the second point of the ordered list of points.

14. A computer readable medium having a program for implementing a method for smoothing and compression of data having an ordered list of points including a first point, a second point and a third point, each of the points being on the perimeter of a polygon, the method comprising:

determining whether the triangle defined by line segments joining the first, second, and third points has a point of significance in its interior; and if no point of significance is present in the region, removing the second point of the ordered list of points.

* * * * *